United States Patent Office 3,412,643
Patented Nov. 26, 1968

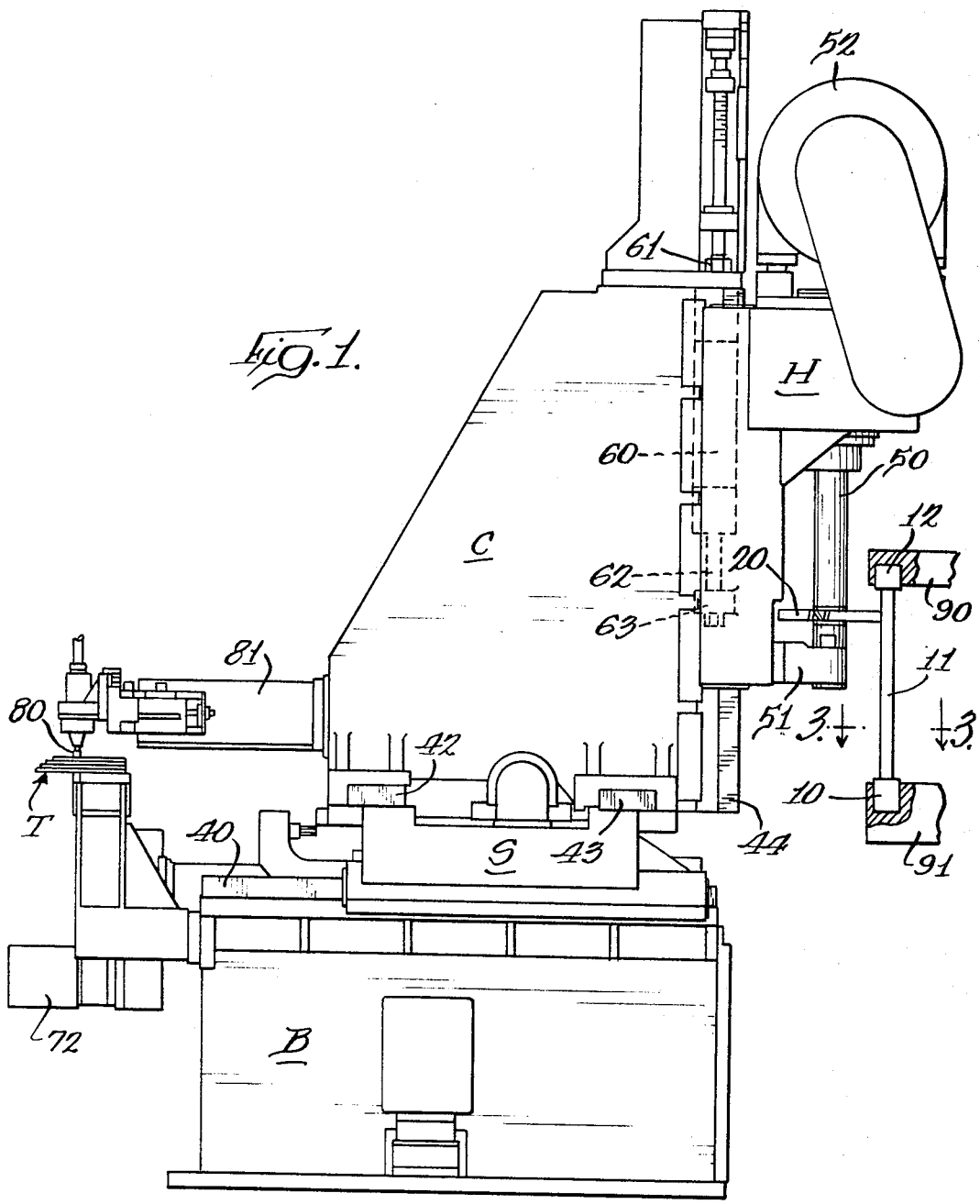

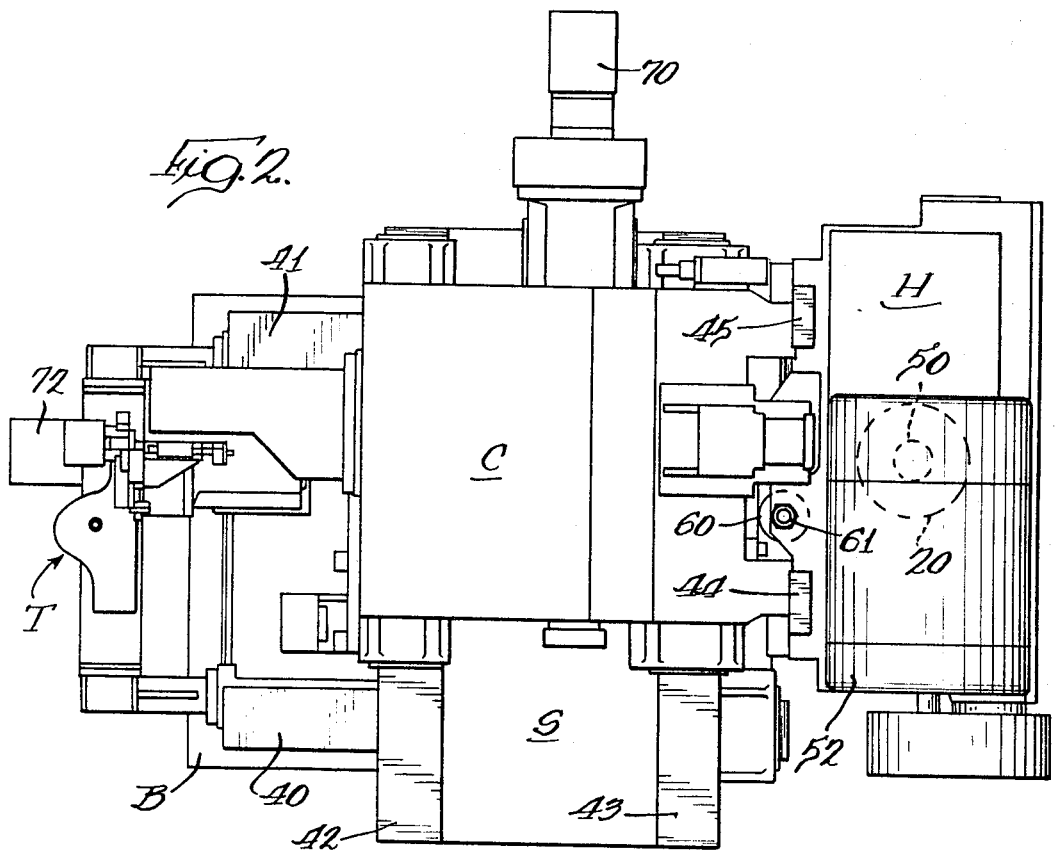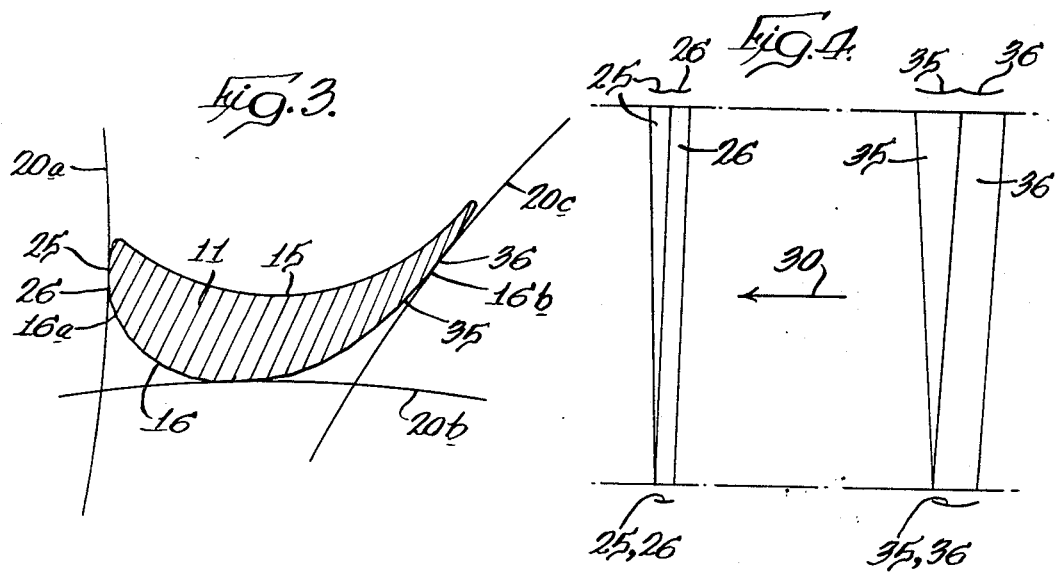

3,412,643
PROFILE MILLING METHOD
Walter S. Swanson, Rockford, and Richard S. Shelden, Cherry Valley, Ill., assignors to Sundstrand Corporation, a corporation of Delaware
Filed Oct. 13, 1966, Ser. No. 586,548
6 Claims. (Cl. 90—13)

This invention relates to a method of machining blade foils.

In the production of blades for turbines and the like, it has been common to machine the foil section in a series of operations; however, in the processes previously known the finishing operations to finish the foil to a final contour and surface finish have been extensive because of the irregularities or scalps left by the initial machining operations.

An object of this invention is to provide a method for shaping a blade foil, leaving a foil surface which can be finished easily on a finishing device, such as a belt grinder moving transversely to the scalps on the foil.

Still another object of the invention is to provide a method for machining a blade foil in which a large diameter milling cutter is moved back and forth along the convex surface of the blade foil to remove metal in each stroke of the cutter and, at the same time, the cutter is progressively advanced about the periphery of said convex surface to provide a series of cut surfaces extending along the length of the blade foil and at a slight angle thereto which can be brought to a uniform, smooth contour by grinding.

Still another object of the invention is to provide a method as defined in the preceding paragraph including the steps of varying the rate of movement of the cutter along the length of the blade foil as the amount of material removal varies, so as to maintain a constant load on the cutter, and also varying the rate of movement of the cutter about the periphery of the foil convex surface to have a lesser rate of movement when the cutter is operating on a portion of the surface of larger radius to maintain substantially uniform loading on the cutter.

Further objects and advantages will become apparent from the following detailed description taken in connection with the accompanying drawings in which:

FIG. 1 is a side elevational view of a mechanism for performing the method;

FIG. 2 is a plan view of the mechanism shown in FIG. 1;

FIG. 3 is an enlarged section of the blade foil, taken generally along the line 3—3 in FIG. 1; and FIG. 4 is a diagrammatic view of a portion of the convex surface of the blade foil illustrating the pattern of the cuts made on the surface thereof.

While this invention is susceptible of embodiment in many different forms, there is disclosed an embodiment of the invention with the understanding that the present disclosure is to be considered as an exemplification of the principles of the invention and is not intended to limit the invention to the embodiment disclosed. The scope of the invention will be pointed out in the appended claims.

The blade on which the method of this invention is performed is shown in FIGS. 1 and 3, with the blade having a base or root 10 and a foil section 11, with a top portion 12 which is removed after the blade is otherwise complete. As shown in FIG. 3, the blade foil 11 has a concave surface 15 and a convex surface 16, with the convex surface 16 having a varying radius about its periphery and with a surface of a relatively small radius in the area indicated generally at 16a and a relatively large radius in the area indicated by 16b. The machining of the concave surface 15 forms no part of this invention and may be performed by a suitable boring operation.

The novel method provides for the machining of a series of surfaces extending longitudinally of the blade foil 11 by the movement of a milling cutter 20 of large diameter back and forth along the blade foil length at a relatively rapid rate while progressively moving the cutter 20 about the periphery of the convex surface 16 of the blade foil 11. The orientation of the cutter 20 relative to the convex surface 16 is illustrated in FIG. 3 by showing a portion of the surface of cutter 20 in three of the many different positions that the cutter takes relative to the blade foil, with these three positions being illustrated by curved lines 20a, 20b, and 20c.

During each stroke of the cutter 20, the cutter and blade foil are also caused to move relative to each other in a peripheral direction about the convex surface of the blade foil so that each of the surfaces cut extends at a slight angle to the longitudinal axis of the blade foil 11. The relation of the successive surfaces cut on the foil is illustrated in FIG. 4, with the relative movement about the periphery of the foil surface 16 being indicated by the arrow 30. The depth of the surfaces is exaggerated for purpose of illustration.

The cutter when in position 20a and as moved lengthwise downwardly along the blade foil will cut a slightly concave surface or scalp 25 on the blade foil, with this surface extending from top to bottom of the blade foil. On the next stroke of the cutter 20 upwardly along the surface of the foil 11, a succeeding slightly concave cut will be made along a surface identified at 26.

The showing in FIG. 4 also illustrates another feature of the invention having to do with the rate of vertical travel of the cutter 20. In cutting the surface 25 as the cutter moves downwardly it will be seen that the width of the cut surface is constant from top to bottom of the blade foil 11, with this surface being indicated by the exaggerated concave surfaces shown at the top and bottom of FIG. 4. On the succeeding cut for making the surface 26 starting at the bottom of the blade foil this surface cut substantially coincides with surface 25, as illustrated at the bottom of FIG. 4. As the cutter reaches the top of the foil, the surface 26 almost leaves surface 25 because of the progression of the cutter about the surface of the foil periphery so that at the top of the foil the surface 26 is of full width and, in effect, abuts the surface 25. The concave surfaces shown at the bottom and top of FIG. 4 have been exaggerated greatly and it will be obvious that only a slight concavity exists, leaving small ridges that can be removed easily by grinding.

As the machining of the blade foil surface 16 progresses, the cutter eventually will be in the position as shown by line 20b and subsequently in the position shown by line 20c. The surfaces made when the cutter is in the area of line 20c are also illustrated in FIG. 4 wherein in a downward stroke of the cutter 20 a surface 35 is cut which is much wider than the surfaces 25 and 26, previously referred to. The cutter operates against a larger radius area 16b of the convex surface 16 and the cutter 20 is therefore effective on a wider width of the surface. On the next upward stroke of the cutter 20, a surface 36 is cut which substantially coincides with the surface 35, as shown at the bottom of FIG. 4, and progressively moves out of coincident relation with the surface 35 until the surfaces 36 and 35 are adjacent as shown at the top of FIG. 4.

In normal operation, the cutting will commence at the upper edge of the foil, as shown in FIG. 3, and operate on a relatively small radius and the cut progresses around the convex surface 16 until completed in the area 16b.

The extent of cut varies about the convex surface of the foil because of the circular nature of the cutter, wherein a relatively narrow surface is cut in the area 16a and this surface gets progressively wider to a maximum in the area 16b. Accordingly, the rate of movement of the cutter about the periphery is decreased to maintain a fairly uniform loading on the cutter throughout the entire cutting operation. The rate of movement of the cutter along the length of the foil is also varied so that when the cutter, for example, is cutting surface 36, as shown in FIG. 4, starting from the bottom, less metal will be removed and the cutter can move upwardly at a fast rate and the speed is reduced when the surface 36 no longer substantially overlaps surface 35 and more metal is removed. As examples, the cutter having a ten-inch diameter can rotate at approximately 200 r.p.m. and the cutter is initially moved at a rate of 150 inches per minute and, as soon as the surface becomes wider, is moved at a reduced rate of 90 inches per minute and immediately before the end of the stroke of the cutter, the rate can be reduced to 15 inches per minute. In one stroke of the cutter 20 along the length of the foil 11, the rate of peripheral movement of the cutter about the blade when operating on the small radius in the area 16a can be $3/16$ of an inch per stroke, while, when operating on a large radius as in area 16b, the speed is reduced to approximately $3/32$ of an inch per stroke.

An example of mechanism for performing the method in operating the cutter 20 is shown in FIGS. 1 and 2 wherein a floor-supported base B has a pair of elongate ways 40 and 41 mounting a saddle S for movement toward and away from the blade 11. The saddle S has a pair of saddle ways 42 and 43 extending at right angles to the base ways 40 and 41 which mount a column C for movement along the length thereof. The column has a pair of vertically-extending ways 44 and 45 at the front thereof which movably mount a head H for up and down movement. The head H mounts a spindle 50, shown in FIG. 1, having the cutter 20 mounted thereon and an arbor support 51 for the spindle. The spindle 50 is driven from a power source carried on the head, such as a motor 52.

The head is operated in its up and down movement along the vertically-extending ways 44 and 45 by a motor in the form of an hydraulic cylinder 60 having its upper end connected to the column, as indicated at 61, and having a rod 62 extending from the lower end thereof which is connected to the head H, as indicated at 63. Through a suitable hydraulic circuit (not shown), the cylinder 60 can be controlled to control the position and rate of up and down movement of the cutter 20 along the blade foil 11.

The movement of the cutter 20 about the periphery of the blade is controlled by movement of the column C relative to the saddle ways 42 and 43 and the base ways 40 and 41. The column C is movable along the saddle ways 42 and 43 by means including a source of power in the form of a motor 70 mounted on the saddle and connected through a drive train, such as a ball screw, to the column whereby the column can be positioned and moved along the saddle ways. The other movement of the column toward and away from the blade is obtained from a power source in the form of a motor 72 mounted on the base B which is connected to the saddle S through a drive train, such as a ball screw, whereby the motor 72 can position the saddle and the column carried thereby along the base ways 40 and 41.

The control of the motors 70 and 72 for positioning the cutter 20 about the periphery of the blade foil can be under the control of a template, indicated generally at T, supported from the base B of the machine and positioned to be followed by a follower 80 carried on an arm 81 extending rearwardly from the rear of the column C. As known in the art, the follower 80 can control a suitable hydraulic circuit or electrical circuit which, through conventional means, can control the motors 70 and 72 whereby the cutter 20 is caused to follow the contour of the template T.

As shown in FIG. 1, the blade has its top 12 and root 10 mounted in suitable fixture arms 90 and 91 to hold the blade during machining of the foil 11.

With the method disclosed herein, the convex surface 16 of the blade foil 11 can be progressively machined by a circular cutter moving at a rapid rate up and down along the length of the foil and progressively moved about the surface to cut a series of surfaces and substantially define the convex surface of the foil. After completion of the machining of the convex surface and boring of the concave surface 15, the blade can be removed from the machine and simply ground to remove the scalp which is the surface presented resulting from the depth due to the use of a round milling cutter. This is easily removed because the grinder can move in a direction transverse to the direction in which the surfaces were cut on the foil.

We claim:

1. A method of machining the convex surface of a blade foil utilizing a rotary milling cutter rotatable about a spindle axis comprising the steps of machining a relatively narrow surface along the length of the foil at a slight angle to the longitudinal axis of the blade, said surface being a small fraction of the convex surface perimeter, machining a succeeding relatively narrow surface along the length of the foil at a slight angle to the longitudinal axis of the blade and substantially overlapping the previous cut, and repeating the machining step a series of times sufficient to remove material from the major part of the blade convex surface.

2. A method as defined in claim 1 wherein each of said machining steps includes a compound movement of the cutter including moving the cutter axially of the blade at a relatively high rate while progressively moving the cutter slowly around the periphery of the foil to have each of said surfaces relatively narrow and at said slight angle to the longitudinal axis.

3. A method as defined in claim 2 including causing the cutter to cut on each stroke along the blade and the axial rate of the cutter is decreased as the cutter moves along the foil to maintain a constant cutting load on the cutter as the cutter moves away from the previously cut surface.

4. A method as defined in claim 3 including varying the rate of movement of the cutter around the periphery of the blade proportional to the radius of the surface to maintain the depth of scallop or reducing the rate to reduce the depth of scallop or increasing the rate to increase the depth of scallop.

5. A method of machining the convex surface of a metal blade foil comprising the steps of mounting the blade in a fixture at a machining station, moving a rotating cutter lengthwise back and forth along the length of the foil at a relatively high speed, and moving the cutter slowly in a direction about the convex contour of the foil during the high speed movement of the cutter to form a series of machined surfaces at a slight angle to the length of the foil.

6. A method as defined in claim 5 including the steps of reducing said relatively high speed movement of the cutter during a stroke of the cutter as the rate of metal removal increases, and reducing the rate of movement of the cutter about the blade periphery as the radius of the foil contour increases because of the greater peripheral extent of each surface cut by the cutter to reduce the load on the cutter.

References Cited

UNITED STATES PATENTS 2,720,141  10/1955  Seyferth _____ 90—13

GERALD A. DOST, *Primary Examiner.*